(12) United States Patent
Naeyaert

(10) Patent No.: US 12,508,617 B2
(45) Date of Patent: Dec. 30, 2025

(54) METHOD FOR MANUFACTURING PANELS, AND FLOOR PANEL OBTAINED HEREBY

(71) Applicant: FLOORING INDUSTRIES LIMITED, SARL, Bertrange (LU)

(72) Inventor: Christophe Naeyaert, Jabbeke (BE)

(73) Assignee: UNILIN BV, Wielsbeke (BE)

( * ) Notice: Subject to any disclaimer, the term of this patent is extended or adjusted under 35 U.S.C. 154(b) by 161 days.

(21) Appl. No.: 17/782,729

(22) PCT Filed: Dec. 9, 2020

(86) PCT No.: PCT/IB2020/061678
§ 371 (c)(1),
(2) Date: Jun. 6, 2022

(87) PCT Pub. No.: WO2021/116926
PCT Pub. Date: Jun. 17, 2021

(65) Prior Publication Data
US 2023/0009503 A1    Jan. 12, 2023

(30) Foreign Application Priority Data

Dec. 12, 2019 (BE) .................................. 2019/5897

(51) Int. Cl.
| | | |
|---|---|---|
| *B05D 3/00* | (2006.01) | |
| *B05B 13/02* | (2006.01) | |
| *B27M 3/04* | (2006.01) | |
| *E04F 15/02* | (2006.01) | |
| *E04F 15/10* | (2006.01) | |

(52) U.S. Cl.
CPC .......... *B05B 13/0214* (2013.01); *B27M 3/04* (2013.01); *E04F 15/02038* (2013.01); *E04F 15/107* (2013.01); *E04F 2201/0107* (2013.01); *E04F 2201/023* (2013.01); *E04F 2201/042* (2013.01); *E04F 2201/043* (2013.01)

(58) Field of Classification Search
CPC ................................... B05D 2/00; B05D 3/00
See application file for complete search history.

(56) References Cited

U.S. PATENT DOCUMENTS

| 4,337,093 A | 6/1982 | Metzner et al. |
|---|---|---|
| 6,620,459 B2 | 9/2003 | Colvin et al. |
| (Continued) | | |

FOREIGN PATENT DOCUMENTS

| CN | 101468486 A | 7/2009 |
|---|---|---|
| CN | 201635332 U | 11/2010 |
| (Continued) | | |

OTHER PUBLICATIONS

DE-29819350-U1 English translation. (Year: 1999).*
(Continued)

*Primary Examiner* — Hai Y Zhang
(74) *Attorney, Agent, or Firm* — Workman Nydegger

(57) ABSTRACT

A method for manufacturing panels includes at least the step of covering one or more side edges of a relevant panel, and moving the panel with its respective side edge relatively beyond an application device. The application device includes at least one nozzle, positioned in the plane of the panel when viewed at an angle of less than 90° to the corresponding side edge. A floor panel includes a covered side edge.

12 Claims, 5 Drawing Sheets

(56) References Cited

U.S. PATENT DOCUMENTS

| | | |
|---|---|---|
| 9,757,974 B2 | 9/2017 | Kalwa |
| 9,957,420 B2 | 5/2018 | Morgeneyer et al. |
| 2002/0023702 A1 | 2/2002 | Kettler |
| 2006/0048675 A1 | 3/2006 | Krusemann et al. |
| 2006/0191226 A1 | 8/2006 | Kim et al. |
| 2007/0160816 A1 | 7/2007 | Linnemann |
| 2008/0256890 A1 | 10/2008 | Pervan et al. |
| 2009/0260313 A1* | 10/2009 | Segaert ............... B44C 5/043 52/592.1 |
| 2010/0175343 A1 | 7/2010 | Kruesemann et al. |
| 2011/0135877 A1 | 6/2011 | Ullerich et al. |
| 2020/0208410 A1 | 7/2020 | Bjorkman et al. |

FOREIGN PATENT DOCUMENTS

| | | | |
|---|---|---|---|
| CN | 201679200 U | 12/2010 | |
| CN | 202039544 U | 11/2011 | |
| CN | 103752450 A | 4/2014 | |
| CN | 108556435 A | 9/2018 | |
| DE | 3517194 A1 | 11/1986 | |
| DE | 9202976 U1 | 5/1992 | |
| DE | 29610462 U1 | 8/1996 | |
| DE | 29819350 U1 * | 1/1999 | ............ B27D 5/003 |
| DE | 29903734 U1 | 5/1999 | |
| DE | 102005024005 A1 | 11/2006 | |
| DE | 102007024261 A1 | 11/2008 | |
| EP | 0022900 A1 | 1/1981 | |
| EP | 0974713 A1 | 1/2000 | |
| EP | 0988420 A1 | 3/2000 | |
| EP | 1167654 A2 | 1/2002 | |
| EP | 1210392 A1 | 6/2002 | |
| EP | 1898024 A1 | 3/2008 | |
| EP | 2239115 A1 | 10/2010 | |
| EP | 2828101 A1 | 1/2015 | |
| EP | 2918747 A1 | 9/2015 | |
| FR | 2890593 A1 | 3/2007 | |
| JP | 3398438 B2 | 4/2003 | |
| JP | 2004358947 A | 12/2004 | |
| JP | 2009269289 A | 11/2009 | |
| WO | WO9747834 A1 | 12/1997 | |
| WO | 0018565 A1 | 4/2000 | |
| WO | 0222332 A1 | 3/2002 | |
| WO | 02060691 A1 | 8/2002 | |
| WO | 2004016422 A1 | 2/2004 | |
| WO | 2004035276 A2 | 4/2004 | |
| WO | 2004076141 A2 | 9/2004 | |
| WO | 2006038867 A1 | 4/2006 | |
| WO | 2006088417 A2 | 8/2006 | |
| WO | 2007067648 A2 | 6/2007 | |
| WO | 2007123298 A1 | 11/2007 | |
| WO | 2008017689 A1 | 2/2008 | |
| WO | 2008078181 A1 | 7/2008 | |
| WO | 2010055429 A2 | 5/2010 | |
| WO | 2010088769 A1 | 8/2010 | |
| WO | 2011045690 A2 | 4/2011 | |
| WO | 2012049577 A2 | 4/2012 | |
| WO | 2012115898 A1 | 8/2012 | |
| WO | 2013068298 A1 | 5/2013 | |
| WO | 2014090939 A1 | 6/2014 | |

OTHER PUBLICATIONS

Search Report from corresponding Belgian Application No. BE2019/5897, Sep. 11, 2020.
International Search Report from PCT Application No. PCT/IB2020/061678, May 11, 2021.

* cited by examiner

METHOD FOR MANUFACTURING PANELS, AND FLOOR PANEL OBTAINED HEREBY

BACKGROUND

The current invention relates to a method for manufacturing panels as well as floor panels obtained hereby.

In particular, the invention relates to panels used to compose, for example, a floating floor covering. Such floor panels are for example known from the WO 97/47834 and may be provided with profiled edge areas on two opposite side edges which include milled coupling means fitting together which allow two such floor panels to be joined together at the respective side edges, preferably without the use of glue. Potentially, the coupling means may be executed with some pre-tensioning, which means that the contour of the coupling means is realized slightly overlapping such that, in a coupled condition, a tension originates which pushes the panels towards each other. Such pre-tensioning is interesting to counteract the formation of gaps after laying. This can also limit the penetration of dust and moisture. In some cases, the milling quality of the coupling means is insufficient to keep the seams permanently watertight. In addition, at the corner points of such panels there is an increased sensitivity to water intrusion. At the corners, the profiled edge areas of adjacent side edges intersect, and because of that it is possible that the milled coupling means may be absent or insufficient there.

In the case of panels with a moisture-sensitive substrate and/or top layer, such as a substrate based on MDF or HDF (medium or high density fiberboard), the penetration of moisture into the seams of a floor covering composed of panels can lead to swellings and/or discolorations that become disturbingly visible on the decorative surface of such panels. Moreover, such swellings of the substrate in themselves can lead to accelerated wear of the floor surface. Furthermore, the penetration of moisture into the seams of a floor covering is problematic in itself, even if neither the substrate nor the top layer are moisture-sensitive. In such a case, water may collect under the floor covering and this may cause the formation of mold and its corresponding unpleasantness.

From WO 2008/078181 it is known to treat the side edges of a floor panel with an MDF or HDF substrate with a water-repellent substance that includes a fluorinated polymer or copolymer. The substance in question is applied to the side edge of the floor panel by means of a so-called vaccumate, e.g. of the type known from the DE 92 02 976 U1. The starting and stopping of such a vaccumate respectively at the entry and exit of the side edge from the vaccumate is difficult to fine-tune and may cause the corner points of the relevant side edge to be insufficiently covered with the relevant water-repellent substance.

SUMMARY

The present invention mainly aims at offering an alternative method for manufacturing panels, wherein, according to various preferred embodiments, a solution can be offered for one or more of the problems with the methods and/or panels from the state of the art.

For this purpose, according to its first independent aspect, the invention concerns a method for manufacturing panels in which the method includes at least the step of covering or treating one or more side edges of a panel concerned, in which the panel with its respective side edge is moved relatively beyond an application device, characterized in that the application device includes at least one, and preferably at least two, nozzles, in which at least one nozzle viewed in the plane of the panel is positioned at an angle of less than 90° with the corresponding side edge. Preferably the application device is stationary while the panel is being moved past the respective nozzles. This can be done, for example, in a so-called "double end tenoner" or feed-through milling machine, for example intended to provide profiled edges on the relevant side edge and the opposite side edge. The nozzles in question can then be fixed while the panel in question is moved by means of the feed mechanism present in the milling machine, for example with a conveyor chain and pressure belts. An arrangement in a feed-through milling machine leads to a better and repeatable application quality. In addition, the relevant side edge can be guided in a vertical direction at the location of the application device between so-called sliding and pressure shoes.

Because the nozzle is positioned at an angle of less than 90° to the relevant side edge, this nozzle can also treat at least partially an adjacent side edge, including the corner between these side edges. Preferably, both nozzles are positioned at an angle of less than 90° to the corresponding side edge. According to the most preferred embodiment, both nozzles are arranged in such a way that a first nozzle operates in a direction with a component which is opposite to the movement of the aforementioned panel and a second nozzle operates in a direction with a component which is parallel to the movement of the aforementioned panel and not opposite but in the same direction of the movement of the panel. In this way, both side edges that are adjacent to the side edge in question can be treated or covered, at least in part. In addition, the respective corners between the respective side edge and the adjacent side edges can also be treated or covered according to the respective application device.

As stated, the first and/or second nozzle is preferably active both on the respective side edge and each time on one of the side edges adjacent to the respective side edge. When a floor panel with its respective side edge is fed in, the first nozzle can become active before the leading corner point passes the first nozzle. In this way, the leading adjacent side edge can be covered at least partially. The second nozzle can remain active after the floor panel with its trailing corner point has passed the second nozzle, in such a way that the trailing adjacent side edge is at least partially covered. Preferably, the part of the relevant side edge treated by means of both nozzles is limited to less than 10 percent of the length of the relevant side edge.

Preferably, the opposite side edge is treated in a similar manner.

It is clear that, due to the special arrangement in which two nozzles can be active in a direction with opposite components, an accurate start-stop control of the nozzles is not required. Namely, as mentioned above, the nozzles can be active for some time on the adjacent side edges of the panel, also in front of and behind the end points of the actual edge to be covered, i.e. in front of and behind the corner points formed with both adjacent side edges.

Preferably the panel is rectangular and elongated, and at least one or both short side edges are covered or treated according to the method of the invention.

Preferably, the aforementioned adjacent side edges are also coated with the same substance, whether or not with a similar application device. Because the corner points are covered by the application device mentioned in the first aspect, it is not necessary to take special measures for covering them when treating the adjacent side edges. It is therefore possible to opt for the application of the application devices known in the state of the art, such as application by means of a vacuum application technique, a spraying technique, a transfer technique for example by means of a rotating wheel that picks up the substance for the covering from a recipient and transfers it to the relevant edge, for example a technique known in itself from the WO 2006/038867. It can of course not be ruled out that the adjacent side edges are treated in a similar way as in the method of the first aspect.

For example, the long side edges of an elongated panel may first be milled or otherwise provided with profiled edges, and covered or treated using state-of-the-art equipment such as by means of a vacumate or transfer technique. The start-stop accuracy is of less importance here, since the ends of the long side edges will still be removed during the profiling of the short edges. Thereafter, the short side edges are preferably milled or otherwise provided with profiled edges and these side edges are covered according to the method of the invention, in which case part of each of the two adjacent long side edges are covered along. In this way, the quality of the covering at the final corner points between short and long side edges is also maximized.

It is clear that, according to the most preferred embodiment of the present invention, at least two nozzles operating in a direction with respective components opposed to and in the direction of the movement of the panel are used. According to an alternative embodiment, it is possible to work with at least one nozzle that is arranged movably, such that it operates on a panel in at least two different directions, preferably at least in a first direction with a component in the direction of the movement of the panel and at least in a second direction with a component opposite to the direction of the movement of the panel. Such an embodiment can be achieved, for example, by arranging the respective nozzle rotatably. It goes without saying that the nozzle in question is preferably controlled and/or moved in such a way that it operates both on the side edge concerned and on both adjacent side edges. Preferably, this is achieved because the nozzle in question operates in a first position in a direction with a component opposite to the movement of the floor panel, when a floor panel is fed in and before the leading corner point passes the nozzle in question. In this way, the leading adjacent side edge can be covered at least partially. The nozzle may remain active and after the floor panel with its trailing corner point has passed the second nozzle, it is active at least, in a second position, in a direction with a component in the direction of the movement of the panel in such a way that the trailing adjacent side edge is at least partially covered by means of the same nozzle. It is preferable for the respective nozzle to rotate from the first to the second position while the nozzle is working on the respective side edge. Potentially, the nozzle can take an intermediate position, perpendicular or roughly perpendicular to the corresponding side edge for providing a covering or treatment on this side edge.

Preferably, the aforementioned covering or treatment includes a water-repellent substance. Alternatively, the aforementioned covering may include a dye, or an air-purifying substance, or a substance emitting a fragrance or perfume. However, the invention is primarily intended for the application of a water-repellent covering. It is clear that such a water-repellent covering or treatment is preferably applied at least in part by means of applying the water-repellent substance by the spraying technique of the invention.

Preferably the aforementioned water-repellent substance is a solvent-based mixture, emulsion or dispersion of a water-repellent substance. By using a solvent other than water, a rapid drying can be achieved without the need for heating devices. Preferably the solvent in question has a flash point above 30° C., or preferably 60° C. or more.

Preferably, the aforementioned panel includes a substrate with a decorative top layer applied to it. Preferably, the decorative top layer itself is impermeable to water, as is the case with a decorative top layer that includes a lacquer layer, for example an acrylic-based lacquer layer, or a melamine layer, or a thermoplastic layer, such as a PVC (PolyVinyl-Chloride) layer. By covering one or more side edges with a water-repellent substance according to the method of the invention of a panel with a decorative top layer applied to it, the effect of moisture from the underside of the decorative top layer can be limited. In the case of a decorative top layer that is in itself impermeable to water, a more water-resistant floor covering can be obtained, as one or more seams between the panels of such a floor covering are now also to some extent water-repellent. If the aforementioned covering applied to one or more side edges includes a dye, it may preferably be chosen to match the decorative top layer, in order to mask for example gaps originated in the floor covering. According to another possibility, the dye may be chosen to be darker or lighter than the decorative top layer, with the aim of accentuating gaps.

Preferably, the aforementioned covering or treatment is applied at least near the edge of the decorative top layer on the relevant side edge. In this way, at least the transition between the side edge and the decorative top layer is provided with, or treated with, the covering. In the case of a covering that includes a water-repellent substance, the risk of moisture penetrating directly under the decorative top layer into the substrate can thus be minimized, and consequently the risk of penetrated moisture having a visible effect on the surface of the panels, for example because the substrate swells and pushes up the decorative top layer at the relevant side edge. In the case of a covering that includes a dye, the risk that part of the substrate remains disturbingly visible immediately adjacent to the decorative top layer can thus be minimized.

Preferably, the panel at least on the relevant side edge and an opposite side edge is provided with profiled edge areas, which include coupling means allowing two such panels to be coupled together at the relevant side edges. Such panels can be put together without glue to form a floor covering. Using the current method, the properties of adjacent side edges in the floor covering can be improved. If, for example, at least one, and preferably both, of the adjacent side edges is provided with a covering with a water-repellent substance, moisture penetration into the glueless coupling between the respective side edges can be avoided. If, for example, at least one, and preferably both, of the adjacent side edges is provided with a covering with a dye, formation of gaps or differences in height between these side edges may to some extent be masked, or accentuated.

Preferably, the panel is provided with a lower edge area, such as a bevel or other chamfer, in its upper surface adjacent to the side edge concerned. Preferably the decorative top layer of the panel, if any, extends uninterruptedly from the overall top surface over the lower edge area in question up onto the side edge covered with a covering. Preferably, the covering in question is realized overlapping with the decorative top layer located on the lower edge area. A lower edge area can in itself to some extent mask the occurrence of gaps or the influences of moisture penetration in the seams between adjacent panels. In addition, the potential overlapping realisation of the covering of the side edge with the top surface can be made less disturbing.

It is clear that the treatment or covering of the invention may result in a layer present on the relevant side edge and/or in an impregnation of the substrate of the panel at the location of the relevant side edge.

Further, it is clear that the current invention also relates to panels obtained by means of the method of the first aspect of the invention. With the same goal as in the first aspect, according to its second independent aspect, the invention further relates to a floor panel for forming a floor covering, wherein said floor panel includes a substrate and a decorative top layer applied to it, wherein the floor panel on at least one side edge is provided with a covering, characterized in that said covering extends uninterruptedly from a first adjacent side edge, along the side edge in question, to a second adjacent side edge. It is clear that the aforementioned covering preferably includes a water-repellent substance. Similar advantages are obtained as described in the first aspect, independent of the type of application device used for this purpose.

Preferably, the floor panel of the second aspect is provided at least on the relevant side edge and an opposite side edge with profiled edge areas, which include coupling means allowing to couple two such panels. Preferably, the aforementioned floor panel is provided with a lower edge area in its upper surface adjacent to the relevant side edge. It is preferable that the aforementioned covering is realized overlapping with the aforementioned lower edge area.

It is clear that the floor panel of the second aspect is preferably obtained by the method of the first aspect, and that the floor panel has corresponding preferred embodiment as the panels mentioned in the first aspect.

BRIEF DESCRIPTION OF THE DRAWINGS

In order to better demonstrate the characteristics of the invention, some preferred embodiments are described below, as an example without any restrictive character, with reference to the accompanying drawings, wherein.

DETAILED DESCRIPTION OF VARIOUS EMBODIMENTS

Figure 1:
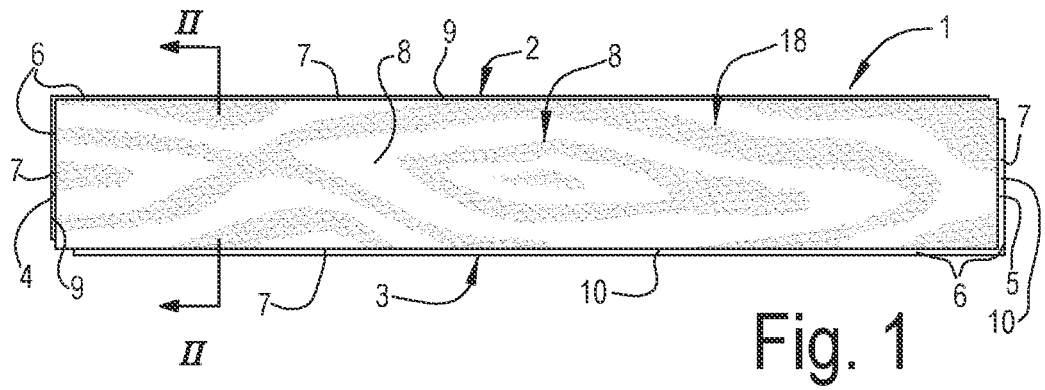
FIG. 1 represents a floor panel obtained according to the method of the first aspect of the invention.

FIG. 1 shows an oblong rectangular floor panel 1 which at two pairs of opposite side edges, 2-3 and 4-5, is provided with profiled edge areas 6 which include mechanical coupling parts 7.

Figure 2:
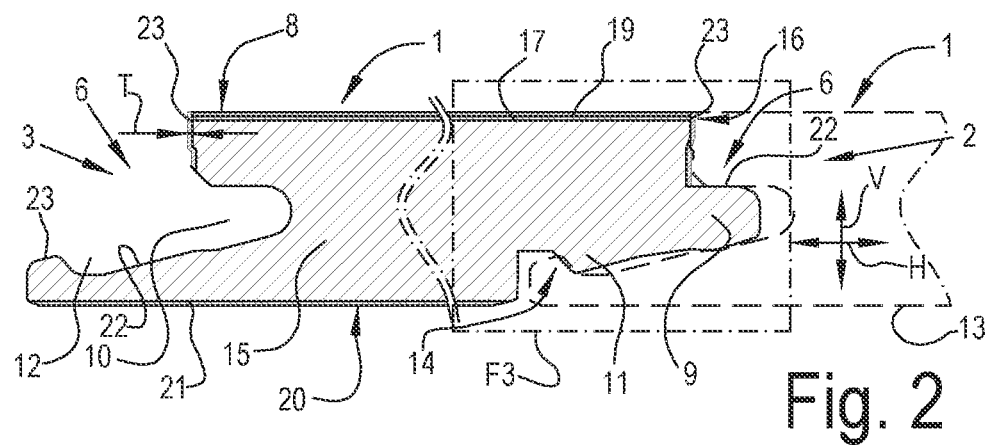
FIG. 2 shows this floor panel in a cross-section according to line II-II shown in FIG. 1.

FIG. 2 clarifies that the used coupling parts 7 allow an interlocking of two such floor panels 1 both in a horizontal direction H as well as in a vertical direction V. For the interlocking in vertical direction V, which is in a direction perpendicular to the top side 8 of the floor panel 1, the coupling parts 7 shown here are mainly in the form of a tongue 9 and a groove 10. Interlocking in the horizontal direction H, i.e. in a direction perpendicular to the vertical direction V referred to above and in the plane of FIG. 2, is obtained, in this case, by means of locking elements in the form of a protrusion 11 on the underside of the tongue 9 and a recess 12 in the lower lip of the groove 10. Upon coupling two such floor panels 1, the locking elements 11-12 cooperate and prevent the floor panels 1 from moving apart. This is shown by the floor panel 1 shown in dashed line 13, where it is clearly visible that there may be an overlap 14 between the not-coupled contours of the groove 10 and the tongue 9, more specifically between the contours of the respective locking elements 11-12. By means of such an overlap 14, a so-called pre-tensioning can be achieved when two floor panels are connected. The concept of pre-tensioning is in itself known from WO 97/47834. Preferably, the used mechanical coupling parts 7 will result in an interlocking free from play of two such floor panels in the aforementioned horizontal direction H and vertical direction V and better still, the coupling parts 7 will result in an interlocking free from play in all directions in the plane determined by the aforementioned directions V and H.

It is clear that the floor panels 1 obtained in the context of the invention may have any shape, such as a rectangular, square, hexagonal or similar shape, as well be provided with any coupling parts 7.

The floor panel 1 shown in FIGS. 1 and 2 is a laminate floor panel 1 containing a substrate 15, where this substrate 13 consists entirely of a wood-based material such as MDF or HDF. In addition, the aforementioned coupling parts 7 are executed in one-piece with this substrate 15. The floor panel 1 also contains a decorative top layer 16 based on plastic. In this case, the decorative top layer 16 is a so-called "DPL" layer which, in this example, consists of a decorative layer 17 with a printed motif 18 and a wear-resistant layer 19 applied to it, such as a so-called overlay. Both the decorative layer 17 and the overlay 19 contain a paper layer soaked in resin. The overlay also contains wear-resistant particles such as corundum. On its underside 20, the floor panel 1 has a counter layer 21 which also contains a layer of paper soaked in resin.

At least part of the surface area 22 of the profiled edge areas 6 is covered with a covering 23 which, in this case, includes a water-repellent substance, such as a fluorinated polymer or copolymer or a cured monomer-free UV lacquer or a copolymer of ethylene acrylic acid.

FIG. 2 shows that the covering 23 or treatment here forms a layer or film with a certain thickness T. In this figure as well as in FIGS. 3 and 4 discussed below, this layer is schematically shown as a layer lying on top of surface 22 of the profiled edge areas 6. It is clear that in reality this layer may have penetrated to a greater or lesser extent, or even completely, into the surface area 22 of the relevant edge area 6. It is clear that priority will be given to limiting the thickness T of the layer on top of the surface 22 to a minimum thickness T, e.g. by applying a suitable dilution to better absorb the covering 23 or treatment into substrate 15. In this way, it does not constitute a major obstacle when coupling the relevant edges 2-3 to a similar floor panel 1. It is noted that the thickness T of the film is shown exaggerated. In reality, the thickness T may be in the micron range or non-existent.

Figures 3, 4:
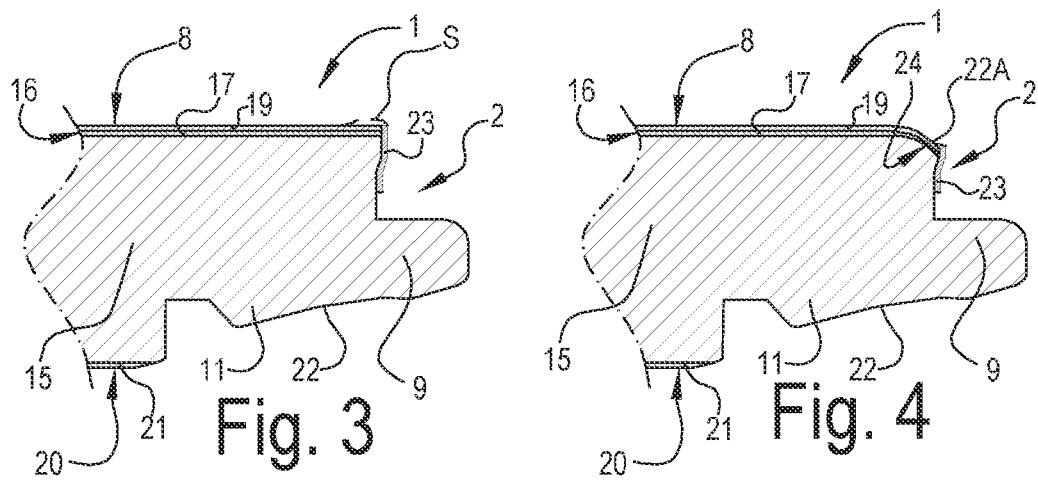
FIG. 3 for a variant on a larger scale shows the area indicated by F3 in FIG. 2.
FIG. 4 shows a variation in a similar view.

FIG. 3 shows a variation where the covering 23 covers the transition between the substrate 15 and the decorative top layer 16 as well as a limited band below the top edge of the floor panel 1. Especially when using a covering 23 with the aforementioned active substances, more specifically fluorinated polymers or copolymers or monomer free UV lacquers, which are particularly effective for forming a waterproof surface, the use of such active substances in the form of a band is also very useful for classic laminate floor panels or other floor panels that are not specifically intended for use in damp rooms. After all, with classic laminate flooring panels there is the disadvantage that when cleaning with a damp cloth, moisture is absorbed into the substrate, causing it to swell and the laminate top layer to be pressed up permanently near the edges of the floor panels. Because a particularly efficient seal can now be achieved by means of the aforementioned active substances, it is no longer possible for moisture to penetrate directly underneath the laminate top layer into the substrate, which eliminates, if not minimizes, the aforementioned effect.

In dashed line S it is shown in FIG. 3 that the covering 23 can also extend to the top surface 8 of the floor panel 1. In general, the aim is for the covering 23 to cover at least the transition between substrate 15 and the top layer 16.

FIG. 4 shows a variant in which the profiled edge areas 6 include at least a surface 22A which is a lower edge area 24 or chamfer, in this case a bevelled edge. As shown, the covering 23 can also be provided on the surface 22A of this lower edge area 24. In the example shown, the decorative top layer 16 extends uninterruptedly from the top surface 8 of the floor panel 1 over the surface 22A of the lower edge area 24.

Figure 5:
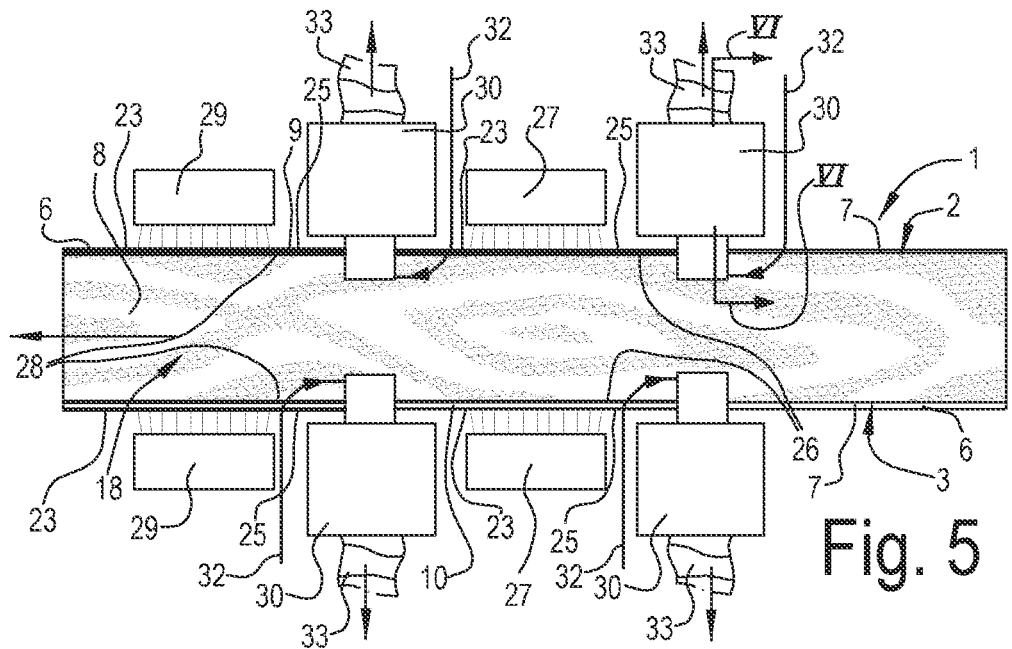
FIG. 5 schematically shows a few steps in a method according to the invention.

FIG. 5 schematically shows a few steps in a method according to the invention with which the floor panel 1 from FIGS. 1 to 4 can be manufactured. Herein, the aforementioned covering 23 in the form of an emulsion or dispersion 25, formed at least by water and the active ingredient applied into it, is applied to the surface 22-22A of profiled edge areas 6. This can be done, for example, as in this case, by means of a jetting or spraying technique by means of a continuous vacuum application device, which will be described in more detail below. However, it is clear that any other technique can be used, such as, for example, spraying by means of a nozzle, loading by means of rollers, raking, pouring, and so on.

In the example shown in FIG. 5, the aforementioned emulsion or dispersion 25 is applied in at least two layers on the surface of edge areas 6, wherein the first applied layer 26 is dried by a drying device 27 before the second layer 28 is applied. After the application of the active substance 23 has been completed, a further forced drying of the profiled edge areas 6 treated with the emulsion or dispersion 25 is carried out using a drying device 29. Such drying can, for example, take place as shown here by radiation such as infrared or ultraviolet radiation. However, it is also possible to use any other technique, such as drying ovens or the technique of supplying hot air.

It is noted that the method shown is a continuous treatment, wherein the floor panel 1 is guided passed nozzles 30 and the drying devices 27-29. Such treatment is easy to fit into current production systems for floor panels.

Figure 6:
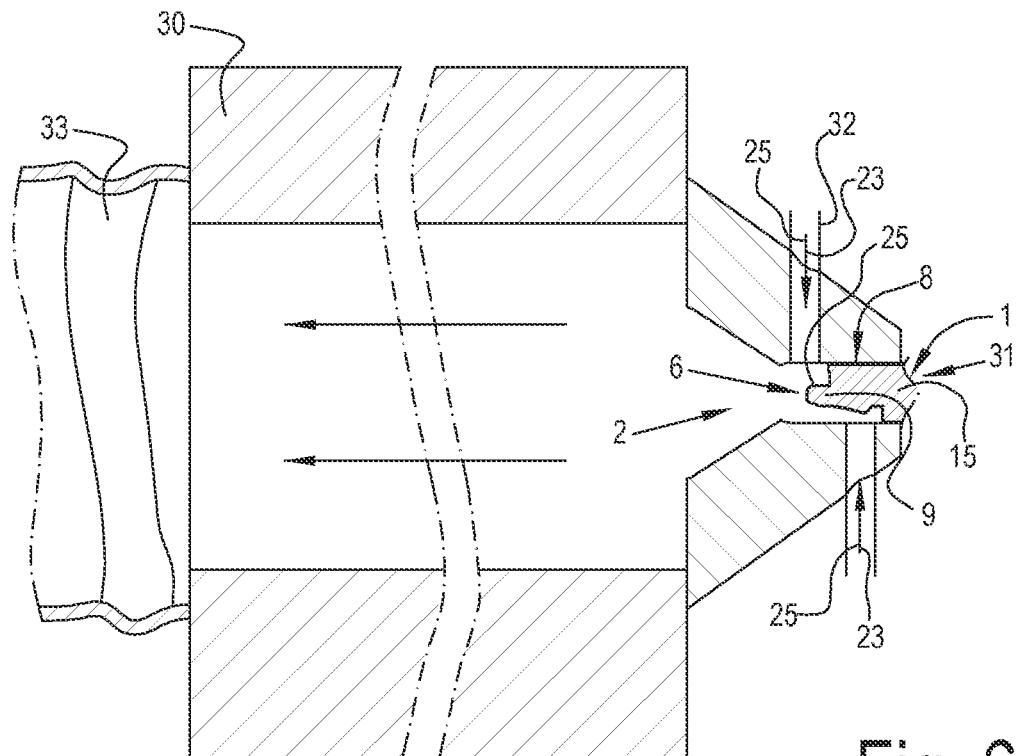
FIG. 6 shows a cross-section according to line VI-VI as shown in FIG. 5.

FIG. 6 schematically shows one of the nozzles 30 used in the example. These are so-called "Schielekoppen", which are for example of the type known from the DE 92 02 976 U1. Such nozzles 30 are usually used for the continuous application of substances on the sides of panels. For this purpose, such nozzles 30 exhibit a so-called passing gap 31 which fits closely, almost without clearance, to the profiled edge area 6 to be treated. The substance to be applied 23-25 is supplied via flexible tubes 32 in the immediate vicinity of the relevant profiled edge areas 6 and any excess substance is immediately sucked back through a suction line 33, so that the risk of the substance contaminating the decorative side or top side 8 of the floor panel 1 is limited. Due to the connection with flexible tubes 32 and 33, such a nozzle 30 is easy to adjust or position in relation to the edge 6 of the floor panel 1 to be treated. It is noted that it is not excluded that the floor panel 1 with its decorative side 8 facing downwards may be guided through the passing gap 31 of such a nozzle 30.

It is clear that in the examples given in FIGS. 2 to 4 and 6, the undisplayed groove side 3-5 of the floor panel 1 has preferably undergone a similar treatment.

FIGS. 7 to 11 show how such a covering can be obtained at the side edges 4 to 5 of the floor panel 1 in FIGS. 1 to 6 by means of a method showing the characteristics of the first aspect of the invention. The figures do not show that the corresponding side edges 4-5 should preferably first be provided with profiled edge areas 6 which include mechanical coupling parts 7, preferably mainly in the form of a tongue 9 and a groove 10.

For this purpose, the floor panel 1 with its relevant side edge 4 is moved relatively beyond an application device 34. The relevant application device 34 comprises at least two nozzles 35-36. A first nozzle 35 is set up at an angle A of less than 90° to the corresponding side edge 4, or, in other words, not perpendicular. In the example, a second nozzle 35 is also set up at an angle B, in this case equal to and opposite to A, of less than 90° to the side edge 4.

It is clear that both nozzles 35-36 are arranged so that the first nozzle 35 operates in a direction with a component which is opposite to the movement or direction of movement D of panel 1, and the second nozzle 36 operates in a direction with a component which is parallel to the movement direction D of said panel 1.

By the arrangement of the nozzles 35-36 in FIGS. 7 to 11, it is achieved that the first nozzle 35 can be active on both side edge 4 and side edge 2 adjacent to it, and that the second nozzle 36 can be active on both side edge 4 and side edge 3 adjacent to it. The obtained covering 23 may then extend uninterruptedly from the first adjacent side edge 2, along the covered side edge 4, up onto the second adjacent side edge 3.

Figure 7:
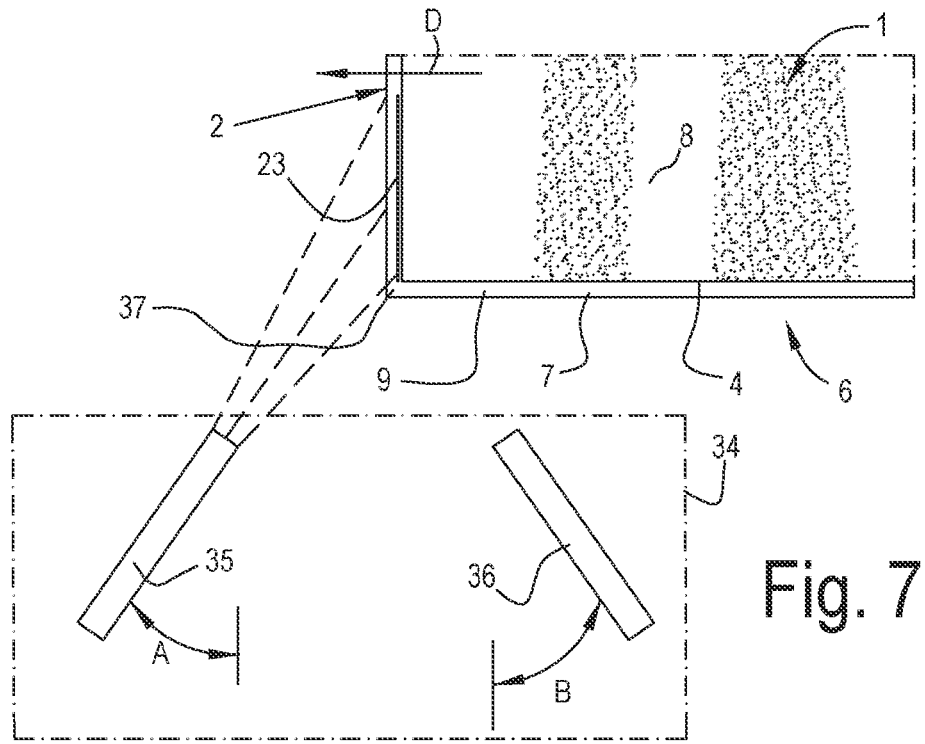
FIGS. 7 to 11 schematically represent a few more steps in a method according to the invention.
Figure 8:
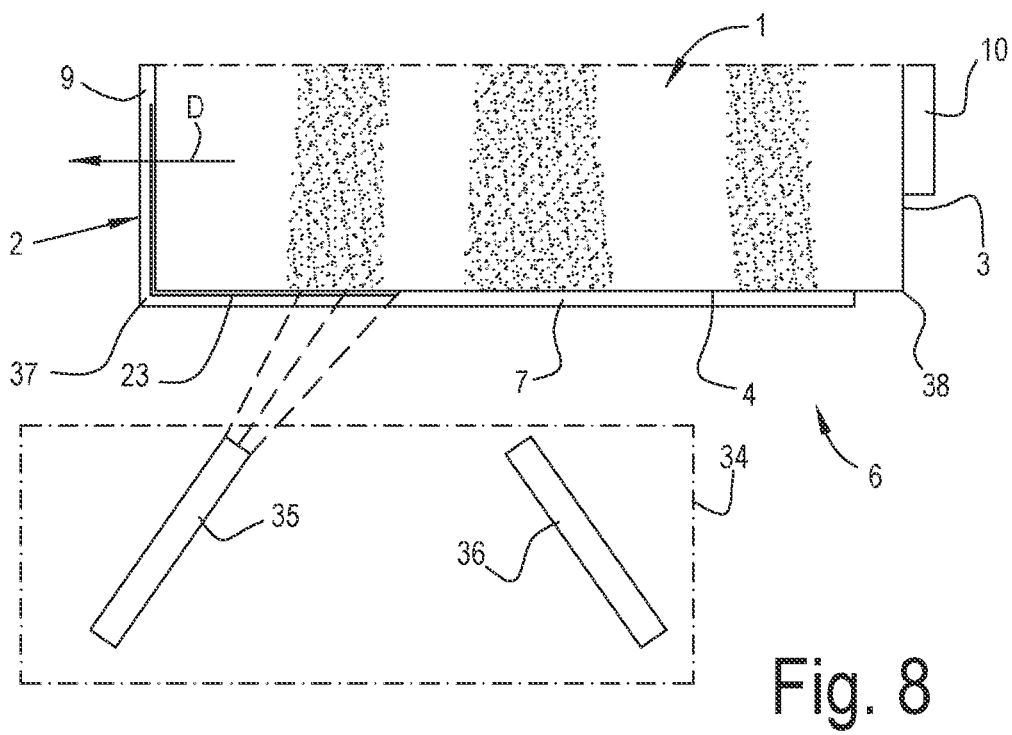
Figure 9:
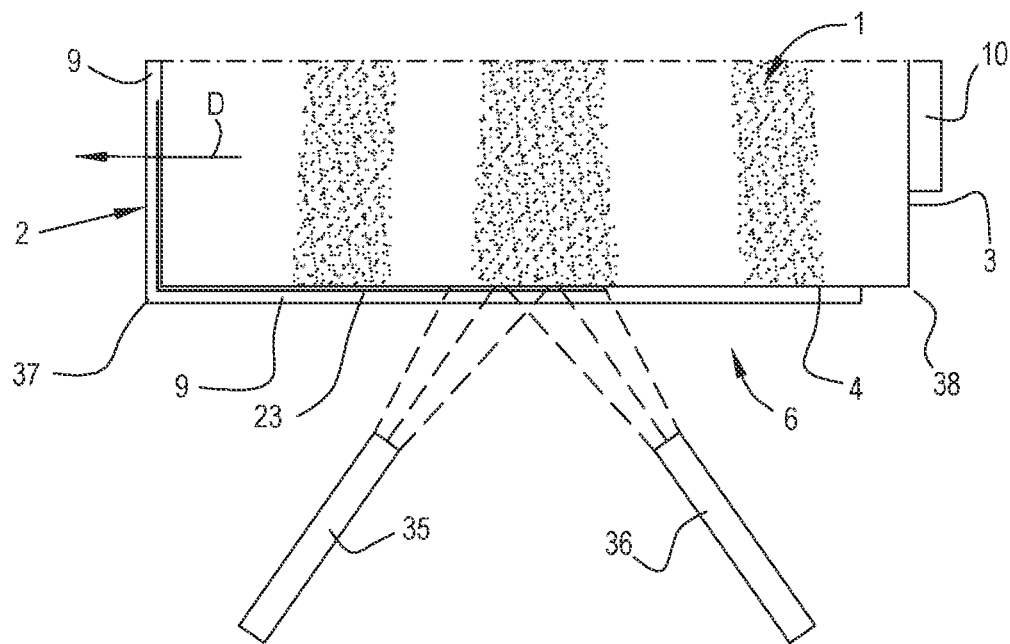
Figure 10:
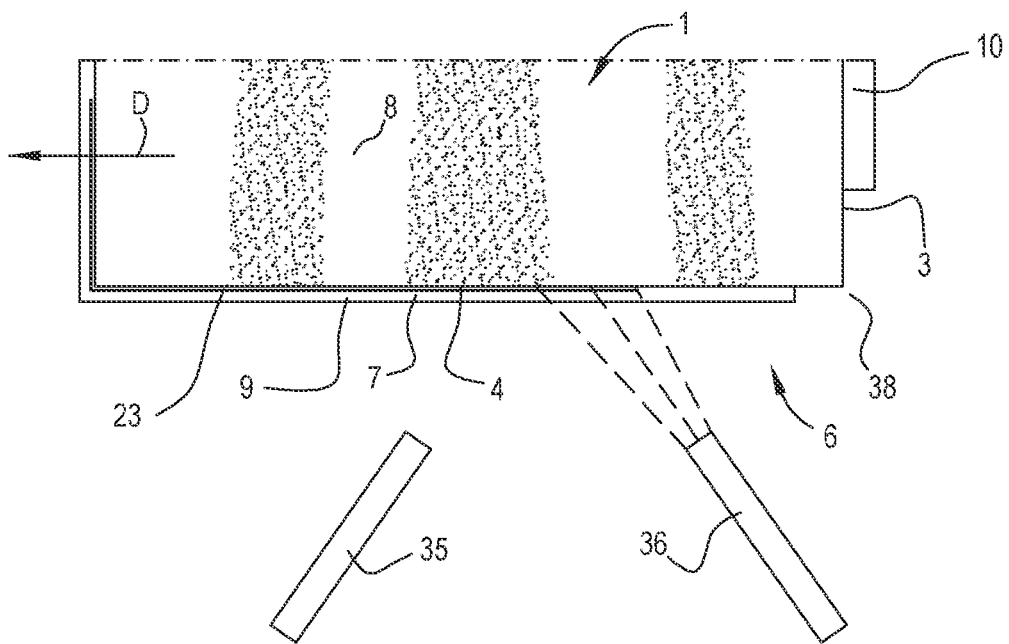
Figure 11:
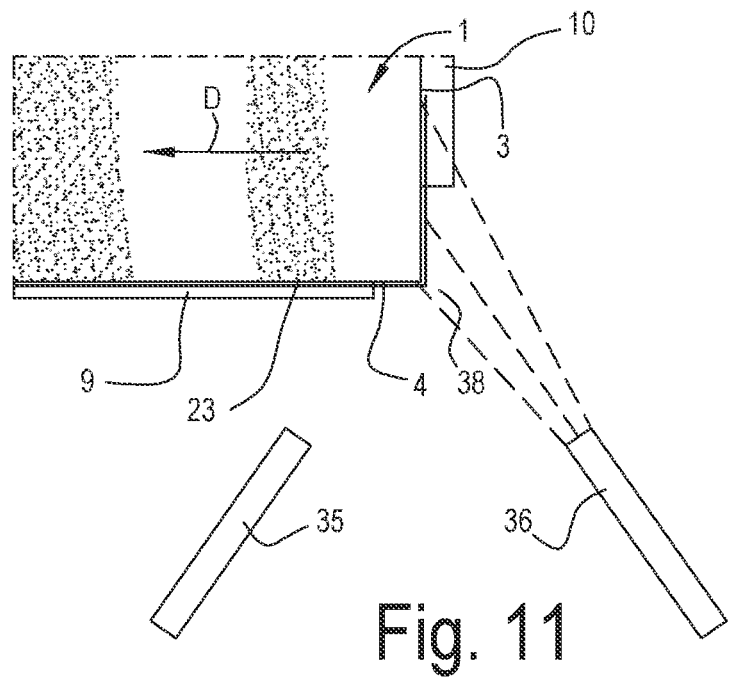
Figure 12:
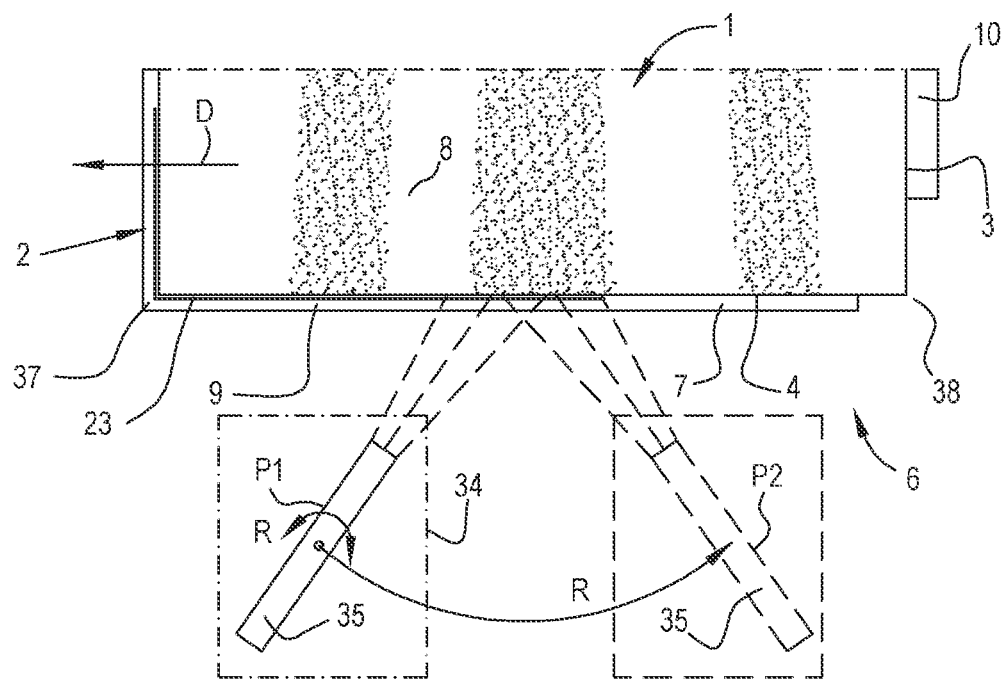
FIG. 12 shows a variation in a view similar to that of FIG. 9.

Such continuous covering 23 is obtained as shown in the figure sequence 7 to 11. FIG. 7 shows that the panel 1 is fed in movement direction D. The first nozzle 35 becomes active before the leading corner point 37 passes the first nozzle 35. The leading adjacent side edge 2 is hereby at least partially covered or treated. FIG. 8 shows that the first nozzle 35 remains active on the actual side edge 4 to be treated. FIGS. 9 and 10 show that the second nozzle 36 becomes active on the side edge 4 and takes over from the first nozzle 35, preferably in an overlapping manner, as shown in FIG. 9. FIG. 11 shows that the second nozzle 36 remains active after the panel 1 with its trailing corner point 38 has passed the second nozzle 36. In this way, the trailing side edge 3 can also be provided at least in part with covering 23.

It is clear that by means of the method illustrated in FIGS. 7 to 10 also at the leading corner point 37 and the trailing corner point 38 a qualitative covering 23 can be obtained. It can therefore straightforwardly be overlapped with the covering 23 applied to the side edges 2-3 as illustrated in FIGS. 5 and 6. It goes without saying that the opposite side edge 5 can also be treated in the same way as illustrated by FIGS. 7 to 10.

In addition, it is clear from FIGS. 7, 9 and 11 that the starting and stopping moment of the provision of the covering by means of the first nozzle 35 and the second nozzle 36 need not necessarily be accurate. The first nozzle 35 and the second nozzle 36 always remain active on a side edge 2,3,4 of panel 1. However, it is important that, in the example, the first nozzle 35 is for a part thereof active on the leading adjacent side edge 2, the second nozzle 36 remains for a part thereof active on the trailing adjacent side edge 3, and that the first nozzle 35 and the second nozzle 36 commonly operate over at least part of the length of the side edge 4. In this way, the angular points 37-38 and the side edge 4 are covered 23 or treated in an uninterrupted manner.

FIG. 11 schematically illustrates the alternative embodiment mentioned in the introduction where at least one moving nozzle 35 is used. The movement of the nozzle 35 is such that, in a first position P1, the nozzle 35 can be operated in a first direction with a component opposite to the direction of movement of the panel—such first position P1 is illustrated on the left-hand side of FIG. 11—and, in a second position P2 can be operated in a second direction with a component parallel to the direction of movement of the panel—such second position P2 is illustrated in dashed line on the right-hand side of FIG. 11. The nozzle 35 performs a rotation movement R for this purpose. By means of the application device 34 in FIG. 11 a similar sequence can be carried out as illustrated in FIGS. 7 to 10 but using only one movible nozzle 35. Preferably the nozzle 35 remains active during the rotation movement R.

It is noted that for the sake of clarity it is not shown in FIGS. 7 to 11 that the side edges 2-3 are preferably already covered or treated, e.g. by the device shown in FIG. 5, and that the covering 23 provided by the application device 34 in FIGS. 7 to 11 may overlap with it.

Generally, it is also noted that potentially indicating means may be incorporated into the covering 23 to be able to check whether it has been applied in a completely covering manner to the desired surface. Such indicators may consist of a dye or a substance which, for example, lights up when irradiated with light or the like.

The present invention is by no means limited to the embodiments described above, but such panels and methods can be realized without going beyond the framework of the present invention.

The invention claimed is:

1. A method for manufacturing panels, wherein the method includes at least the step of providing a covering or treatment including substance on one or more side edges of a relevant panel,
    wherein the panel with its respective side edge is moved relatively beyond an application device,
    wherein the application device comprises at least one nozzle,
    wherein at least one nozzle viewed in the plane of the panel is positioned at an angle of less than 90° to the relevant side edge, and treats said relevant side edge with said substance;
    wherein the substance is a water-repellant substance located upon at least a portion of a surface area of the relevant side edge and forming a discrete film or layer on the relevant side edge;
    wherein the substance is applied by the at least one nozzle as an emulsion or dispersion, and then the panel undergoes a drying treatment with a drying device to form said film or layer.

2. The method according to claim 1, wherein first and second nozzles of said at least one nozzle are positioned at an angle of less than 90° to the relevant side edge and another relevant side edge, respectively.

3. The method according to claim 2, wherein the first and second nozzles are arranged in such a way that a first nozzle operates in a direction with a component which is opposite to the movement of the said panel and the second nozzle operates in a direction with a component which is parallel to the movement of the said panel.

4. The method according to claim 3, wherein at least one of the first and second nozzles is active both on the respective side edge and each time on one of the side edges adjacent to the respective side edge.

5. The method according to claim 1, wherein the covering or treatment includes another substance that is water-repellent.

6. The method according to claim 1, wherein the panel comprises a substrate with a decorative top layer applied to it.

7. The method according to claim 6, wherein the covering or treatment is applied at least near the edge of the decorative top layer on the relevant side edge.

8. The method according to claim 1, wherein the panel at least at the relevant side edge and an opposite side edge is provided with profiled edges comprising mechanical coupling parts, which enable two such panels to be coupled together at the corresponding side edges.

9. The method according to claim 1, wherein the panel in its upper surface adjacent to the side edge concerned is provided with a lower edge area.

10. The method according to claim 1, further comprising the step of sucking back an excess amount of substance through a suction line.

11. The method according to claim 1, wherein the substance penetrates the relevant side edge.

12. The method according to claim 1, wherein the at least one nozzle sprays or jets the substance onto the relevant side edge.

* * * * *